(12) United States Patent
Kihara et al.

(10) Patent No.: US 8,785,019 B2
(45) Date of Patent: Jul. 22, 2014

(54) NEGATIVE ELECTRODE FOR A NICKEL-HYDROGEN RECHARGEABLE BATTERY AND A NICKEL-HYDROGEN RECHARGEABLE BATTERY USING THE SAME

(75) Inventors: Masaru Kihara, Takasaki (JP); Takahiro Endo, Takasaki (JP); Toshiki Sato, Takasaki (JP); Akira Saguchi, Takasaki (JP); Satoshi Wada, Takasaki (JP); Isao Mugima, Takasaki (JP); Tomomi Nakamura, Takasaki (JP); Hideyuki Asanuma, Takasaki (JP); Masanori Tamura, Takasaki (JP)

(73) Assignee: FDK Twicell Co., Ltd., Takasaki-shi, Gunma (JP)

( * ) Notice: Subject to any disclaimer, the term of this patent is extended or adjusted under 35 U.S.C. 154(b) by 40 days.

(21) Appl. No.: 13/485,767

(22) Filed: May 31, 2012

(65) Prior Publication Data
US 2012/0315524 A1 Dec. 13, 2012

(30) Foreign Application Priority Data
Jun. 9, 2011 (JP) .................................. 2011-129051

(51) Int. Cl.
*H01M 10/0587* (2010.01)
(52) U.S. Cl.
USPC .......................................................... 429/94
(58) Field of Classification Search
None
See application file for complete search history.

(56) References Cited

FOREIGN PATENT DOCUMENTS

| JP | 3266371 A | 11/1991 |
|----|-----------|---------|
| JP | 2000-228201 A | 8/2000 |
| JP | 2003168422 A | 6/2003 |
| JP | 2005056681 A | 3/2005 |
| JP | 2006156186 A | 6/2006 |
| JP | 2009211970 A | 9/2009 |

OTHER PUBLICATIONS

Extended European Search Report for European Patent Application No. 12170988.5-1227, dated Aug. 21, 2012.

*Primary Examiner* — Patrick Ryan
*Assistant Examiner* — Wyatt McConnell
(74) *Attorney, Agent, or Firm* — Marshall, Gerstein & Borun LLP (57) ABSTRACT

A negative electrode for a nickel-hydrogen rechargeable battery is a strip-shaped negative electrode, the negative electrode being formed of a core body and a negative mixture layer covering the core body and containing hydrogen-storage alloy particles, including a main section, both sides of which face the positive electrode with the separator intervening therebetween as viewed in a rolled state where the negative electrode forms the electrode group with the positive electrode and the separator, and an outermost circumferential portion and an innermost circumferential portion that are protruding from ends of the main section in a rolling direction and facing the positive electrode with the separator intervening therebetween only with one side, wherein the hydrogen-storage alloy particles contained in the outermost circumferential portion and the innermost circumferential portion have an average diameter larger than an average diameter of the hydrogen-storage alloy particles contained in the main section.

16 Claims, 3 Drawing Sheets

NEGATIVE ELECTRODE FOR A NICKEL-HYDROGEN RECHARGEABLE BATTERY AND A NICKEL-HYDROGEN RECHARGEABLE BATTERY USING THE SAME

BACKGROUND OF THE INVENTION

1. Field of the Invention

The present invention relates to a negative electrode for a nickel-hydrogen rechargeable battery and a nickel-hydrogen rechargeable battery using the negative electrode.

2. Description of the Related Art

One well-known type of alkaline rechargeable battery is the nickel-hydrogen rechargeable battery. The nickel-hydrogen rechargeable battery has a higher capacity and is environmentally safer than a nickel-cadmium rechargeable battery. For these reasons, the nickel-hydrogen rechargeable battery is used for a variety of applications including various portables, hybrid electric vehicles, etc. Because of these various applications, it has been anticipated that the nickel-hydrogen rechargeable battery will be further increased in capacity.

The capacity of the positive electrode of a nickel-hydrogen rechargeable battery is determined by the amount of nickel hydroxide held in a positive electrode plate. The capacity of the negative electrode of the nickel-hydrogen rechargeable battery is determined by the amount of hydrogen-storage alloy held in a negative electrode plate. Accordingly, in order to increase the capacity of the nickel-hydrogen rechargeable battery, it is necessary to increase the amount of the nickel hydroxide and the hydrogen-storage alloy. However, the size of batteries is standardized, and it is impossible to increase internal volume. In order to increase the battery capacity, it is required to increase the filling density of the nickel hydroxide and the hydrogen-storage alloy to be infiltrated into electrode plates.

In the case of the nickel-hydrogen rechargeable battery, the negative electrode is designed to have higher capacity than the positive electrode because, when the battery is overcharged, the oxygen gas produced at the positive electrode is reduced in the negative electrode to prevent the inner pressure of the rechargeable battery from increasing. It is then highly required that the hydrogen-storage alloy in the negative electrode of the nickel-hydrogen rechargeable battery is highly densified. The negative electrode having high-density hydrogen-storage alloy is generally fabricated as below. First, a negative mixture layer containing hydrogen-storage alloy powder is attached to a core body serving as an electrode plate such as punching metal sheet. In the next step, the negative mixture layer undergoes a rolling process by being applied with a high rolling load. This way, a negative electrode in which hydrogen-storage alloy is highly densified is fabricated (see Unexamined Japanese Patent Publication No. 2000-228201, for example).

If the rolling load is increased to achieve the higher density of the hydrogen-storage alloy in the negative electrode, hydrogen-storage alloy particles are pulverized and decreased in diameter. If the diameter of the hydrogen-storage alloy particles is decreased, this increases the total surface area per unit mass, namely, specific surface area, of the hydrogen-storage alloy powder contained in the negative electrode. If the specific surface area is increased, a region of contact between the hydrogen-storage alloy and alkaline electrolyte grows larger. Accordingly, the corrosion reaction of the hydrogen-storage alloy is accelerated. This causes the problem that the cycle life of the battery is shortened.

One considerable way to prevent such a problem is to utilize hydrogen-storage alloy particles having large diameter. In other words, the hydrogen-storage alloy particles having large particles are not easily pulverized by being applied with a high rolling load, so that the diameter of the particles remains large, and the specific surface area of the hydrogen-storage alloy powder is decreased. As a result, the corrosion reaction of the hydrogen-storage alloy is delayed, and improvement in cycle life characteristics can be expected.

However, if the particle diameter of the whole hydrogen-storage alloy powder is simply increased, this increases damage caused on the core body by the hydrogen-storage alloy particles during the rolling process. The negative electrode produced in this manner has an undulating shape instead of being flat, and is thus deteriorated in shape quality. If this low-quality negative electrode is rolled with a separator and a positive electrode, an electrode group thus produced has a deformed shape. This makes it impossible to assemble a battery.

SUMMARY OF THE INVENTION

An aspect of the present invention is directed to a negative electrode for a nickel-hydrogen rechargeable battery that is a strip-shaped negative electrode forming an electrode group with a positive electrode and a separator, which is to be contained in an outer can of a nickel-hydrogen rechargeable battery, the negative electrode being formed of a core body and a negative mixture layer covering both sides of the core body and containing a large number of hydrogen-storage alloy particles, the negative electrode including a main section, both sides of which face the positive electrode with the separator intervening therebetween as viewed in a rolled state where the negative electrode forms the electrode group with the positive electrode and the separator, and a protruding region that is protruding from an end of the main section in a rolling direction and facing the positive electrode with the separator intervening therebetween only with one side, wherein at least part of the hydrogen-storage alloy particles contained in the protruding region has an average diameter larger than an average diameter of the hydrogen-storage alloy particles contained in the main section.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

A nickel-hydrogen rechargeable battery in which a negative electrode of the invention is installed (hereinafter, referred to as a battery) will be described below with reference to the attached drawings.

Figure 1:
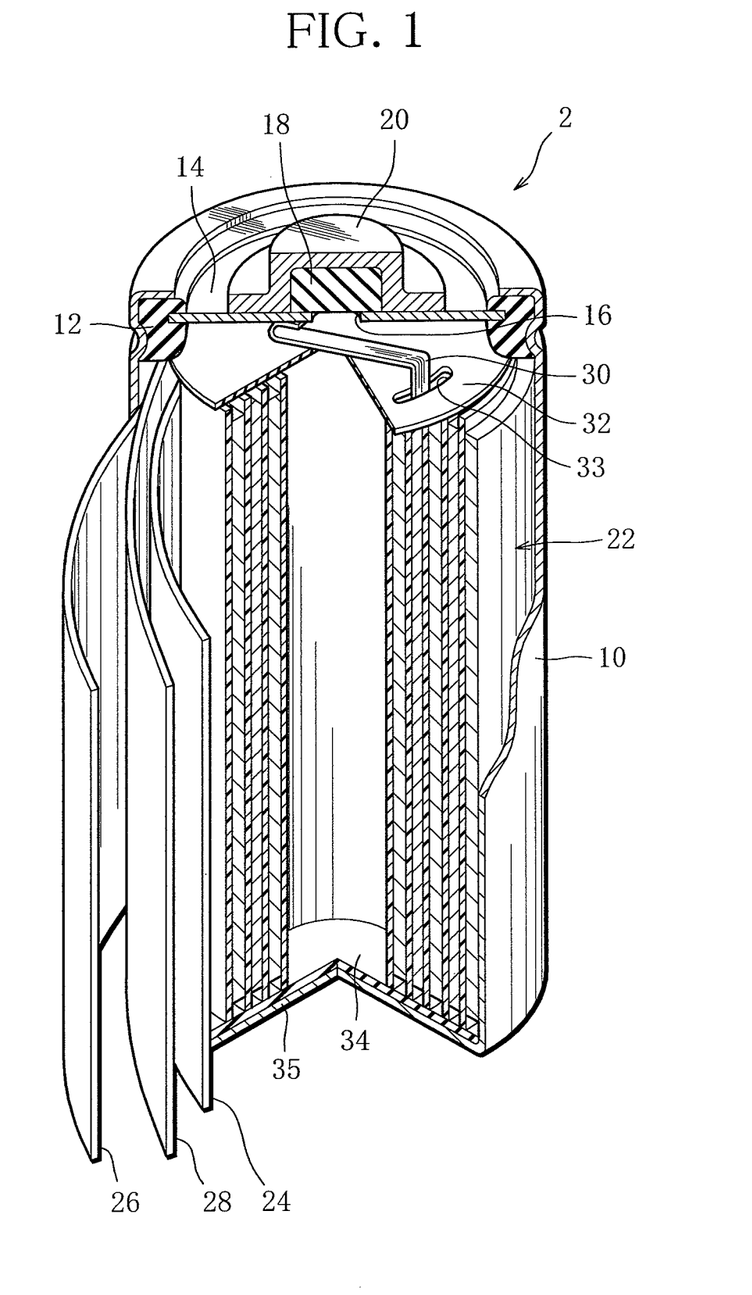
FIG. 1 is a perspective view showing a nickel-hydrogen rechargeable battery of one embodiment of the present invention partially taken away.

FIG. 1 shows, for example, an AA-size cylindrical battery 2.

The battery 2 includes an outer can 10 having a shape like a bottomed cylinder. The outer can 10 has an upper end formed into an open end. The outer can 10 possesses conductivity and has a bottom wall 35 that functions as a negative terminal. Inside the open end of the outer can 10, a disc-shaped conductive lid plate 14 is set with a ring-shaped insulating packing 12, which encircles the lid plate 14, intervening between the open end and the lid plate 14. The lid plate 14 and the insulating packing 12 are fixed to the open end of the outer can 10 by caulking the rim of the open end of the outer can 10. The lid plate 14 and the insulating packing 12 airtightly close the open end of the outer can 10 in consort with each other.

The lid plate 14 has a vent hole 16 in the center thereof. A rubber valve body 18 that closes the vent hole 16 is placed on an outer surface of the lid plate 14. Furthermore, a cylindrical flanged positive terminal 20 is fixed onto the outer surface of the lid plate 14 so as to cover the valve body 18. The positive terminal 20 presses the valve body 18 towards the lid plate 14. Accordingly, the vent hole 16 is usually closed by the valve body 18 in an airtight manner. If gas generates in the outer can 10, and inner pressure is increased, the valve body 18 is compressed by the inner pressure and opens the vent hole 16. In result, the gas is discharged from the outer can 10 through the vent hole 16 and the positive terminal 20. In short, the vent hole 16, the valve body 18 and the positive terminal 20 form a safety valve for the battery.

The outer can 10 contains an electrode group 22. The electrode group 22 includes a positive electrode 24, a negative electrode 26 and a separator 28, each having a strip-like shape. The positive electrode 24, the negative electrode 26 and the separator 28 are rolled into a scroll with the separator 28 sandwiched between the positive electrode 24 and the negative electrode 26. That is to say, the positive electrode 24 and the negative electrode 26 are superimposed upon each other with the separator 28 intervening therebetween.

In the outer can 10, a positive lead 30 is disposed between one end of the electrode group 22 and the lid plate 14. One end of the positive lead 30 is connected to the positive electrode 24, and the other end to the lid plate 14. The positive electrode 24 is electrically connected to the positive terminal 20 through the positive lead 30 and the lid plate 14. Disposed between the lid plate 14 and the electrode group 22 is a circular insulting member 32. The positive lead 30 extends through a slit 33 formed in the insulating member 32. Moreover, a circular insulating member 34 is disposed between the electrode group 22 and the bottom of the outer can 10.

The outer can 10 is infused with a predetermined amount of alkaline electrolyte, not shown. The positive electrode 24, the negative electrode 26 and the separator 28 are impregnated with the alkaline electrolyte. The alkaline electrolyte accelerates a charge/discharge reaction between the positive electrode 24 and the negative electrode 26. The alkaline electrolyte is not particularly limited in kind, and may be, for example, a sodium hydroxide aqueous solution, a lithium hydroxide aqueous solution, a potassium hydroxide aqueous solution, an aqueous solution prepared by mixing two or more of the above-mentioned aqueous solutions or the like. Likewise, the alkaline electrolyte is not particularly limited in concentration. The concentration may be, for example, 8N (normality).

Figure 2:
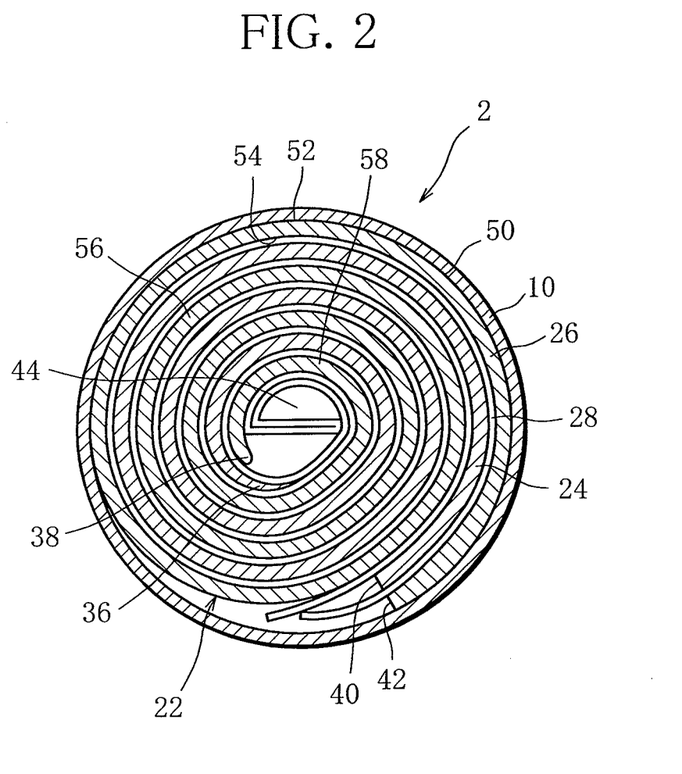
FIG. 2 is a cross-sectional view of the nickel-hydrogen rechargeable battery of the one embodiment of the present invention.

Referring to FIG. 2, in the electrode group 22, the positive electrode 24 and the negative electrode 26 are superimposed upon each other in a radial direction of the electrode group 22 with the separator 28 sandwiched therebetween.

More specifically, the electrode group 22 is formed by preparing the positive electrode 24, the negative electrode 26 and the separator 28, each having a strip-like shape, and rolling the positive electrode 24 and the negative electrode 26 from first-end side of the electrodes 24 and 26 into a scroll with the separator 28 sandwiched therebetween by using a rolling core. First ends (rolling starting ends) 36 and 38 of the positive electrode 24 and the negative electrode 26 are positioned in a center side of the electrode group 22, whereas second ends (rolling finishing ends) 40 and 42 of the positive electrode 24 and the negative electrode 26 are positioned in an outer circumferential side of the electrode group 22. The outer circumference of the electrode group 22 is not covered with the separator 28. An outermost circumferential portion 50 of the negative electrode 26 forms the outer circumference of the electrode group 22. An outward face (outer surface) 52 of the outermost circumferential portion 50 of the negative electrode 26 as viewed in a radial direction of the electrode group is not covered with the separator 28 and is therefore exposed. The outer surface 52 and a circumferential wall of the outer can 10 are in contact with each other. The negative electrode 26 and the outer can 10 are thus electrically connected together. An inward face (inner surface) 54 of the outermost circumferential portion 50 of the negative electrode 26 as viewed in the radial direction of the electrode group faces the positive electrode 24 with the separator 28 intervening therebetween. To put it differently, the outermost circumferential portion 50 of the negative electrode 26 faces the positive electrode 24 only with the inner surface 54 thereof.

In the negative electrode 26, the main section 56 continues to extend more inwardly than the outermost circumferential portion 50. An innermost circumferential portion 58 continues to extend in the vicinity of the center of the scroll of the electrode group 22, which is located further inside than the main section 56. The main section 56 is a portion in which both the outer surface 52 and the inner surface 54 of the negative electrode 26 face the positive electrode 24 with the separator 28 intervening therebetween. The main section 56 is rolled into a scroll to extend to the vicinity of the scroll of the electrode group 22. The innermost circumferential portion 58 is positioned in the center of the electrode group 22. The outer surface 52 of the innermost circumferential portion 58 faces the positive electrode 24 with the separator 28 intervening therebetween.

The rolling core is pulled out after the rolling, whereby a space 44 having a shape corresponding to the shape of the rolling core is formed in the center of the electrode group 22.

Usable materials for the separator 28 include, for example, polyamide nonwoven fabric, polyolefin nonwoven fabric, such as polyethylene and polypropylene, provided with a hydrophilic function, etc.

The positive electrode 24 is formed of a conductive positive substrate having a porous structure and a positive mixture held in holes of the positive substrate.

The positive substrate may be, for example, a net-like, sponge-like or fibrous metal body that is plated with nickel.

The positive mixture contains positive-electrode active material particles, a conducting material and a binding agent. The binding agent binds to bind the positive-electrode active material particles and the conducting material together, and binds the positive mixture to the positive substrate.

The positive-electrode active material particles are nickel hydroxide particles or high-order nickel hydroxide particles. The nickel hydroxide particles may be a solid solution containing cobalt, zinc, cadmium or the like.

The conducting material may be, for example, one or more materials selected from cobalt compounds including cobalt oxide (CoO), cobalt hydroxide (Co(OH)$_2$) and the like and cobalt (Co). The conducting material is added to the positive mixture as appropriate. The conducting material may be added into the positive mixture in the form of powder or may be contained in the positive mixture so as to coat the surface of the positive-electrode active material.

The binding agent of the positive mixture may be, for example, carboxymethylcellulose, methylcellulose, PTFE (polytetrafluoroethylene) dispersion, HPC (hydroxypropylcellulose) dispersion or the like.

The positive electrode 24 is fabricated, for example, in the following manner.

First, positive-electrode active material powder including nickel hydroxide particles, water, a conducting material and a binding agent are prepared and kneaded into positive slurry. The positive slurry is infiltrated into, for example, a sponge-like nickel metal body and then dehydrated. After the positive slurry is dehydrated, the metal body filled with the nickel hydroxide particles or the like undergoes a rolling process and a cutting process. This way, the positive electrode 24 is fabricated.

Figure 3:
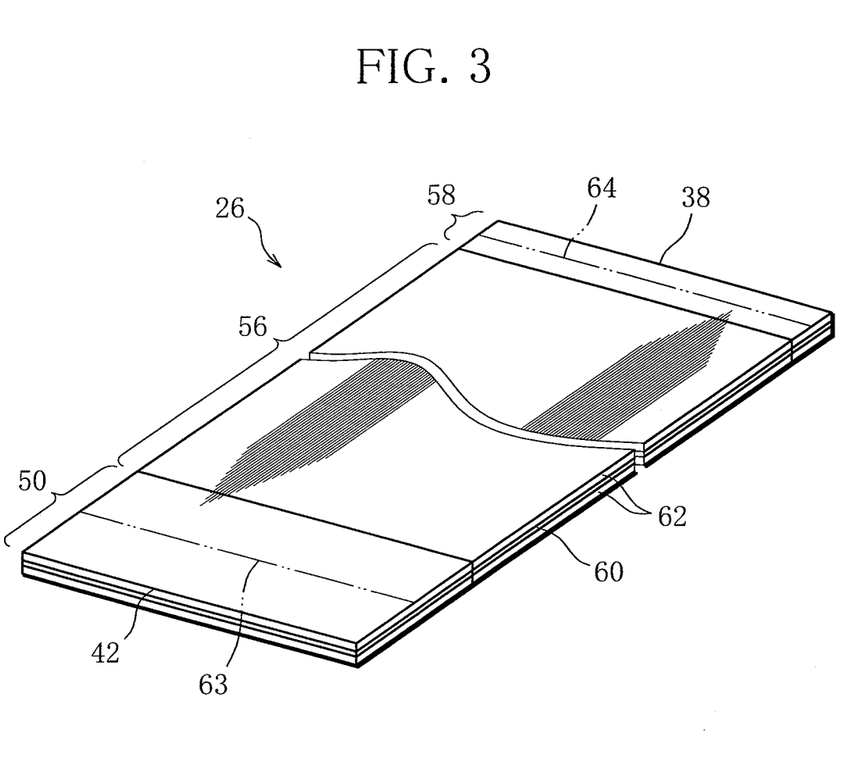
FIG. 3 is a perspective view schematically showing a negative electrode used for the nickel-hydrogen rechargeable battery of the one embodiment of the present invention.

As shown in FIG. 3, the negative electrode 26 has a strip-shaped conductive negative-electrode core 60. A negative mixture 62 is held in the negative-electrode core 60.

The negative-electrode core 60 is made of a sheet-like metal member in which through-holes are distributed. For example, the core 60 may be made of a punching metal sheet or a sintered substrate obtained by subjecting metal powder to die forming and sintering processes. The negative mixture 62 is not only infiltrated into the through-holes of the negative-electrode core 60 but also held in a layer on each side of the negative-electrode core 60.

The negative mixture 62 contains hydrogen-storage alloy particles capable of storing and discharging hydrogen serving as negative-electrode active material, a conducting material and a binding agent. As the binding agent, hydrophilic or hydrophobic polymer or the like may be used. As the conducting material, graphite, carbon black, ketjen black or the like may be used.

The hydrogen-storage alloy of the hydrogen-storage alloy particles is not particularly limited, and may be, for example, of AB$_5$-type (CaCu$_5$-type structure), AB$_{3.5}$-type (Ce$_2$Ni$_7$-type structure), AB$_{3.8}$-type (Pr$_5$Co$_{19}$-type structure) or the like.

The hydrogen-storage alloy particles can be obtained, for example, in the following manner.

Metal raw materials are weighed and mixed together to have a predetermined composition. This mixture is melted, for example, by an induction melting furnace, and then refrigerated into an ingot. The ingot thus obtained is subjected to heat treatment in which the ingot is heated under an inert-gas atmosphere at a temperature of 900 to 1200 degrees centigrade for 5 to 24 hours. The heat treatment homogenizes the ingot. The ingot is subsequently pulverized into particles. The particles thus produced are classified by sieving, thereby obtaining hydrogen-storage alloy particles in various diameters. Among the hydrogen-storage alloy particles thus obtained, two kinds groups of different diameters are selected. Preferably, one is a group of relatively small particles in average diameter (hereinafter, referred to as first particles), and the other is a group of particles in larger average diameter than the first particles (hereinafter, referred to as second particles). For example, the first particles have an average diameter ranging from 40 to 50 μm, and the second particles from 50 to 125 μm. Preferably, a diameter ratio of the first particles to the second particles (first particles:second particles) ranges from 1:1.25 to 1:2.5, and more preferably, 1:1.25 to 1:2.0.

The negative electrode 26 is fabricated, for example, in the following manner.

First, hydrogen-storage alloy powder consisting of the first particles of hydrogen-storage alloy, a conducting material, a binding agent and water are kneaded into negative slurry (hereinafter, first slurry). Likewise, hydrogen-storage alloy powder consisting of the second particles of hydrogen-storage alloy, a conducting material, a binding agent and water are kneaded into negative slurry (hereinafter, second slurry).

The first slurry thus obtained is applied onto the negative-electrode core 60 such as a punching metal sheet, and is then dehydrated. In this process, the first slurry is applied onto both sides of a portion of the punching metal sheet 60, which corresponds to the main section 56, so as to be even and constant in thickness.

After the dehydration of the first slurry, both sides of a portion apart from the portion corresponding to the main section 56, that is, both sides of a portion corresponding to the outermost circumferential portion 50 and the innermost circumferential portion 58, are applied with the second slurry evenly and constantly in thickness. The second slurry is thereafter dehydrated.

Preferably, the content of the hydrogen-storage alloy particles per unit volume of the second slurry is half the content of the hydrogen-storage alloy particles per unit volume of the first slurry.

In the next place, the punching metal sheet 60 holding the negative mixture 62 obtained by dehydrating the first slurry and the second slurry is subjected to the rolling process to have predetermined thickness, and then cut into predetermined size, to thereby obtain the negative electrode 26.

More specifically, the punching metal sheet 60 holding the dehydrated negative mixture 62 is led to a gap between a pair of rollers and pressed from both sides in the thickness direction thereof to be extended. In the rolling process, the pressing force of the rollers is subjected to variable control so as to become smaller in the outermost circumferential portion 50 and the innermost circumferential portion 58 than in the main section 56. Due to the variable control, in the negative electrode 26, the average diameter of the hydrogen-storage alloy particles contained in the outermost circumferential portion 50 and the innermost circumferential portion 58 is larger than that of the hydrogen-storage alloy particles contained in the main section 56.

Preferably, a thickness ratio of the main section 56 to the outermost and innermost circumferential portions 50 and 58 ranges from 1:1 to 1:0.85. That is to say, if the outermost circumferential portion 50 and the innermost circumferential portion 58 are formed to be thin by being applied with an extremely high pressing force, the hydrogen-storage alloy particles contained therein are pulverized, reducing the diameter of the hydrogen-storage alloy particles. In result, the specific surface area of the hydrogen-storage alloy powder contained in the negative electrode 26 is increased, which accelerates the process of corrosion reaction of the entire negative electrode in relation to the electrolyte. Furthermore, if the outermost circumferential portion 50 and the innermost circumferential portion 58 are formed to be thin by being applied with an extremely high pressing force, the negative-electrode core is also damaged, which deteriorates the shape quality of the negative electrode. Preferably, therefore, the thickness of the outermost and innermost circumferential portions 50 and 58 is set to fall in a range from 1 to 0.85, where the thickness of the main section 56 is 1.

As illustrated in FIG. 3 showing in development view the negative electrode 26 obtained as described above, the negative electrode 26 has the main section 56 in the center thereof, and the outermost and innermost circumferential portions 50 and 58 extend from both ends of the main section 56 in a continuous manner.

The hydrogen-storage alloy contained in the main section 56 consists of the first particles whose average diameter is relatively small. This way, the negative electrode 60 is prevented from being damaged, and at the same time, the hydrogen-storage alloy is increased in density. The main section 56 is a portion facing the positive electrode 24 in both sides and greatly contributing to the charge/discharge reaction of the battery. If the density of the hydrogen-storage alloy is high in this portion, the battery is enabled to have high capacity.

The hydrogen-storage alloy contained in the outermost circumferential portion 50 and the innermost circumferential portion 58 consists of the second particles whose average diameter is relatively large. As the outermost circumferential portion 50 and the innermost circumferential portion 58 are portions facing the positive electrode 24 only in one side and therefore contributing relatively less to the charge/discharge of the battery as compared to the main section 56. For this reason, the necessity of densification of the hydrogen-storage alloy is lower in the outermost circumferential portion 50 and the innermost circumferential portion 58 than in the main section 56. It is therefore not required to increase the rolling load to be applied to the outermost circumferential portion 50 and the innermost circumferential portion 58. Accordingly, even if the hydrogen-storage alloy particles whose average diameter is large are arranged in the outermost circumferential portion 50 and the innermost circumferential portion 58, the damage caused onto the negative-electrode core 60 is minor. If the hydrogen-storage alloy particles with large average diameter are arranged in the proper portions as described, the total surface area of the hydrogen-storage alloy particles contained in the entire negative electrode 26 can be reduced. Since the specific surface area of the hydrogen-storage alloy powder contained in the negative electrode is reduced, the process of corrosion reaction in relation to the alkaline electrolyte can be retarded, so that the battery thus obtained has improved cycle life characteristics.

Consequently, in the negative electrode 26, the diameter of the hydrogen-storage alloy particles is slightly reduced by the rolling process, but the average diameter of the hydrogen-storage alloy in the outermost circumferential portion 50 and the innermost circumferential portion 58 is kept larger than that of the hydrogen-storage alloy in the main section 56. In the negative electrode 26, the filling density of the hydrogen-storage alloy in the outermost circumferential portion 50 and the innermost circumferential portion 58 is lower than the filling density of the hydrogen-storage alloy in the main section 56.

The invention is not limited to the above-described one embodiment, and may be modified in various ways. According to the embodiment, the entire negative electrode except for the main section 56, namely, the entire outermost circumferential portion 50 and the innermost circumferential portion 58 contain the hydrogen-storage alloy particles with larger average diameter (hereinafter, referred to as large-diameter particles) than the hydrogen-storage alloy particles (hereinafter, referred to as small-diameter particles) contained in the main section 56. The invention is not limited to this aspect but is applicable to any aspect as long as the large-diameter particles are contained in at least a part of the portion of the negative electrode, apart from the main section 56. Such aspects include, for example, one in which the large-diameter particles are contained only in a region between the center (shown by a chain double-dashed line 63 in FIG. 3) of the outermost circumferential portion 50 and the rolling finishing end 42, and the small-diameter particles are contained in the other region expanding from the center 63 of the outermost circumferential portion 50 through the main section 56 to the innermost circumferential portion 58; one in which the large-diameter particles are contained only in a region between the center (shown in a chain double-dashed line 64 in FIG. 3) and the rolling starting end 38, and the small-diameter particles are contained in the other region expanding from the center 64 of the innermost circumferential portion 58 through the main section 56 to the outermost circumferential portion 50; one in which the large-diameter particles are contained only in the entire outermost circumferential portion 50, and the small-diameter particles are contained in the main section 56 and the outermost circumferential portion 58; one in which the large-diameter particles are contained only in the innermost circumferential portion 58, and the small-diameter particles are contained in the main section 56 and the outermost circumferential portion 50, and the like.

Embodiments

1. Production of a Battery

Embodiment 1

(1) Fabrication of a Negative Electrode

A rare-earth ingredient was prepared so as to contain La of 60 percent, Ce of 20 percent, Pr of 5 percent, and Nd of 15 percent. The rare-earth ingredient, Ni, Co, Mn and Al were mixed together at a molar ratio of 1.00:3.80:0.70:0.25:0.35. The result was melted in an induction melting furnace and then refrigerated into an ingot.

The ingot was subjected to heat treatment that heats the ingot for 10 hours under an argon gas atmosphere at a temperature of 1000 degrees centigrade to be homogenized. The ingot was thereafter mechanically pulverized under the argon gas atmosphere, thereby turning into hydrogen-storage alloy powder. The hydrogen-storage alloy powder thus obtained was sieved and classified into two groups of the hydrogen-storage alloy powder having different sizes. Particle size distribution of each group of the hydrogen-storage alloy powder was measured by means of a laser diffraction scattering device for measuring particle size distribution. Average particle diameter of the hydrogen-storage alloy powder 50 percent by weight integral in one of the groups (first particles) was 45 µm, and that in the other group (second particles) was 100 µm.

According to an analysis of the composition of the hydrogen-storage alloy powder by means of an inductively coupled plasma emission spectrometer (ICP), the composition was $(La_{0.60}Ce_{0.20}Pr_{0.05}Nd_{0.15})Ni_{3.80}Co_{0.70}Mn_{0.25}Al_{0.35}$. Moreover, the hydrogen-storage alloy powder was subjected to X-ray diffraction measurement (XRD measurement). It was thus found that the hydrogen-storage alloy powder had a $CaCu_5$-type crystal structure.

100 parts by mass of powder of the first particles was added with 0.1 part by mass of carboxymethylcellulose, 0.5 parts by mass (in solid content equivalent) of a dispersion of styrene-butadiene copolymer rubber (SBR) (50 percent by mass in solid content), 0.5 parts by mass of ketjen black, 50 parts by mass of water. The result was kneaded at room temperature, to thereby prepare negative slurry (first slurry).

100 parts by mass of powder of the second particles was added with 0.1 part by mass of carboxymethylcellulose, 0.5 parts by mass (in solid content equivalent) of a dispersion of styrene-butadiene copolymer rubber (SBR) (50 percent by mass in solid content), 0.5 parts by mass of ketjen black, 50 parts by mass of water. The result was kneaded at room temperature, to thereby prepare negative slurry (second slurry).

The first slurry was applied onto both sides of a metal porous sheet from the center 63 of a portion serving as the outermost circumferential portion 50 of an electrode group when the sheet was rolled to the main section 56 and the innermost circumferential portion 58 so as to be uniform and constant in thickness. The first slurry was then dehydrated. The first slurry was applied so that the thickness thereof was 0.745 mm and so that the content of the hydrogen-storage alloy per unit volume was 2.8 g/cm$^3$.

The second slurry was applied onto both sides of a region expanding from the center 63 of a portion serving as the outermost circumferential portion 50 to the rolling finishing end 42 so as to be uniform and constant in thickness. The second slurry was then dehydrated. The second slurry was applied so that the thickness thereof was 0.425 mm and so that the content of the hydrogen-storage alloy per unit volume was 2.8 g/cm$^3$.

The porous sheet had a thickness of 60 µm and was nickel-plated.

After the dehydration of the first slurry and the second slurry, the porous sheet holding a negative mixture layer containing the hydrogen-storage alloy powder was rolled and cut into an AA-size negative electrode 26. The content of the hydrogen-storage alloy per negative electrode was set at 9.0 grams.

Rollers with a diameter of 300 mm were used to carry out the rolling process after the rollers were so adjusted that a pressing force acting upon the region of the outermost circumferential portion 50, which was applied with the first slurry, the main section 56 and the innermost circumferential portion 58 was 100 kN and so that a pressing force acting upon the region of the outermost circumferential portion 50, which was applied with the second slurry, was 10 kN.

After the rolling process, the thickness of the region of the outermost circumferential portion 50, which was applied with the first slurry, the main section 56 and the innermost circumferential portion 58 was 0.390 mm, and the region of the outermost circumferential portion 50, which was applied with the second slurry, was 0.370 mm. A thickness ratio of the main section 56 to the portion of the outermost circumferential portion 50, which was located closer to the rolling finishing end 42 (region of the outermost circumferential portion 50, which was applied with the second slurry), was 1:0.95.

The diameter of the hydrogen-storage alloy particles of the negative electrode 26 thus obtained was measured. The alloy particles contained in the region of the outermost circumferential portion 50, which was applied with the first slurry, the main section 56 and the innermost circumferential portion 58 had a diameter of 32 µm. The alloy particles contained in the region between the center 63 of the outermost circumferential portion 50 and the rolling finishing end 42 had a diameter of 58 µm. The filling density of the hydrogen-storage alloy particles was 5.6 g/cm$^3$ in the region of the outermost circumstantial portion 50, which was applied with the first slurry, the main section 56 and the innermost circumferential portion 58, and 3.2 g/cm$^3$ in the region between the center 63 of the outermost circumferential portion 50 and the rolling finishing end 42.

(2) Fabrication of a Positive Electrode

A sodium hydroxide aqueous solution of 1 mol/l was added drop by drop into a mixed aqueous solution of nickel sulfate, sulfate of zinc, and cobalt sulfate while the mixed aqueous solution was being stirred so that zinc was 3.0 percent by mass and so that cobalt was 1 percent by mass in relation to metallic nickel. Deposit was produced so that pH was maintained at 13 to 14 during the above reaction. The produced deposit was separated by filtration and rinsed with 10 parts pure water three times. The deposit was subsequently dewatered and dehydrated. In this manner, nickel hydroxide powder serving as positive-electrode active material was obtained.

Positive slurry was prepared by adding 40 percent by mass of hydroxypropylcellulose dispersion solution serving as a binding agent into mixed powder consisting of 89.5 percent by mass of the nickel hydroxide powder obtained as mentioned, 10 percent by mass of cobalt hydroxide, and 0.5 percent by mass of yttrium oxide so that the hydroxypropylcellulose dispersion solution was 50 percent by mass of the mass of the mixed powder.

The positive slurry was infiltrated into a nickel foam that was approximately 600 g/m$^2$ in area density (density), 95 percent in porosity, and approximately 2 mm in thickness. The result was dehydrated, subjected to the rolling process to have a positive-electrode active material density of approximately 2.9 g/cm$^3$, and then cut into predetermined size. In this manner, the positive electrode 24 made of non-sintered nickel electrode was obtained.

(3) Assembly of a Nickel-Hydrogen Rechargeable Battery

The positive and negative electrodes 24 and 26 thus obtained were rolled into a scroll with the separator 28 sandwiched therebetween, and thus, the electrode group 22 was produced. The separator 28 used for producing the electrode group 22 was made of polypropylene fiber nonwoven cloth and was 0.1 mm in thickness (40 g/m$^2$ in fiber density).

The electrode group 22 was accommodated in an outer can 10 having a shape like a bottomed cylinder. Moreover, 2.2 grams of alkaline electrolyte (30 percent by mass of a sodium hydroxide aqueous solution containing lithium and potassium) was injected into the outer can 10. The opening of the outer can 10 was closed with a lid plate 14 or the like. This way, an AA-size sealed nickel-hydrogen rechargeable battery 2 having a nominal capacity of 1600 mAh was assembled. The nickel-hydrogen rechargeable battery is called battery A.

Embodiment 2

The first slurry was applied onto the main section 56 and the innermost circumferential portion 58, and the second slurry onto the entire outermost circumferential portion 50. The rolling process was carried out so that the pressing force acting upon the main section 56 and the innermost circumferential portion 58 was 100 kN and so that the pressing force acting upon the outermost circumferential portion 50 was 10 kN. Other than that, a nickel-hydrogen rechargeable battery (battery B) was assembled in the same manner as the battery A of Embodiment 1.

The diameter of the hydrogen-storage alloy particles of the negative electrode 26 thus obtained was measured. The alloy particles contained in the main section 56 and the innermost circumferential portion 58 had a diameter of 32 µm. The alloy particles contained in the outermost circumferential portion 50 had a diameter of 58 µm. The filling density of the hydrogen-storage alloy particles was 5.6 g/cm$^3$ in the main section 56 and the innermost circumferential portion 58, and 3.2 g/cm$^3$ in the outermost circumferential portion 50.

Embodiment 3

The first slurry was applied onto the main section 56 and the outermost circumferential portion 50, and the second slurry onto the entire innermost circumferential portion 58. The rolling process was carried out so that the pressing force acting upon the main section 56 and the outermost circumferential portion 50 was 100 kN and so that the pressing force acting upon the innermost circumferential portion 58 was 10 kN. Other than that, a nickel-hydrogen rechargeable battery (battery C) was assembled in the same manner as the battery A of Embodiment 1.

The diameter of the hydrogen-storage alloy particles of the negative electrode 26 thus obtained was measured. The alloy particles contained in the main section 56 and the outermost circumferential portion 50 had a diameter of 32 μm. The alloy particles contained in the innermost circumferential portion 58 had a diameter of 58 μm. The filling density of the hydrogen-storage alloy particles was 5.6 g/cm$^3$ in the main section 56 and the outermost circumferential portion 50, and 3.2 g/cm$^3$ in the innermost circumferential portion 58.

Embodiment 4

The first slurry was applied onto the main section 56, and the second slurry onto the entire outermost circumferential portion 50 and the entire innermost circumferential portion 58. The rolling process was carried out so that the pressing force acting upon the main section 56 was 100 kN and so that the pressing force acting upon the outermost circumferential portion 50 and the innermost circumferential portion 58 was 10 kN. Other than that, a nickel-hydrogen rechargeable battery (battery D) was assembled in the same manner as the battery A of Embodiment 1.

The diameter of the hydrogen-storage alloy particles of the negative electrode 26 thus obtained was measured. The alloy particles contained in the main section 56 had a diameter of 32 μm. The alloy particles contained in the outermost circumferential portion 50 and the innermost circumferential portion 58 had a diameter of 58 μm. The filling density of the hydrogen-storage alloy particles was 5.6 g/cm$^3$ in the main section 56, and 3.2 g/cm$^3$ in the outermost circumferential portion 50 and the innermost circumferential portion 58.

Comparative Example 1

The first slurry was thoroughly applied onto the main section 56, the outermost circumferential portion 50 and the innermost circumferential portion 58. The rolling process was carried out so that the pressing force acting upon the main section 56, the outermost circumferential portion 50 and the innermost circumferential portion 58 was 100 kN. Other than that, a nickel-hydrogen rechargeable battery (battery E) was assembled in the same manner as the battery A of Embodiment 1.

The diameter of the hydrogen-storage alloy particles of the negative electrode 26 thus obtained was measured. The alloy particles were 32 μm in diameter and 5.6 g/cm$^3$ in filling density.

Comparative Example 2

The second slurry was thoroughly applied onto the main section 56, the outermost circumferential portion 50 and the innermost circumferential portion 58. The rolling process was carried out so that the pressing force acting upon the main section 56, the outermost circumferential portion 50 and the innermost circumferential portion 58 was 100 kN. Other than that, the negative electrode 26 was fabricated in the same manner as Embodiment 1. However, the negative electrode 26 subjected to the rolling process was in an undulating shape instead of being flat. As a consequence, it was impossible to assemble a battery by using the negative electrode 26.

2. Tests of Nickel-hydrogen Rechargeable Batteries (1) Initial Activation Processing The batteries A to E twice underwent a charge-discharge cycle in which the batteries were charged for 16 hours at a temperature of 25 degrees centigrade and at a charging current of 0.1 C and then discharged at a discharging current of 0.2 C until battery voltage reached 0.5 V. This way, the batteries A to E were subjected to initial activation processing.

(2) Battery Capacity Measurement

The batteries A to E subjected to the initial activation processing were charged for 16 hours at a charging current of 0.1 C and discharged at a discharging current of 0.2 C until the battery voltage reached 0.8 V. The capacity of each battery was measured.

A ratio of each battery capacity to the capacity of the battery E of Comparative Example 1 was obtained, with the capacity of the battery E being 100. The result is shown in Table 1 as battery capacity ratio.

(3) Test of Cycle Life Characteristics

The batteries A to E subjected to the initial activation processing were charged at a charging current of 1.0 C in atmosphere at a temperature of 25 degrees centigrade so that the battery voltage was reduced to 10 mV after reaching a maximum value. Thereafter, the batteries A to E were left to stand for 30 minutes.

The batteries A to E were discharged at a discharging current of 1.0 C in the same atmosphere until the battery voltage reached 0.8 V, and then left to stand for 30 minutes.

Assuming that the charge-discharge cycle was 1 cycle, the number of cycles before the batteries were not able to be discharged was counted and considered as cycle life. A ratio of the cycle life of each battery to the cycle life of the battery E of Comparative Example 1 was found, with the number of cycles the battery E needed to reach the cycle life being 100. The result is shown in Table 1 as cycle life characteristics ratio.

TABLE 1

| | Region of the negative electrode, in which large-diameter particles (second particles) exist | | | Cycle life |
| --- | --- | --- | --- | --- |
| | Outermost circumferential portion | Innermost circumferential portion | Battery capacity ratio | characteristics ratio |
| Embodiment 1 (Battery A) | Part | None | 100 | 120 |
| Embodiment 2 (Battery B) | All | None | 100 | 135 |
| Embodiment 3 (Battery C) | None | All | 100 | 134 |
| Embodiment 4 (Battery D) | All | All | 100 | 192 |
| Comparative Example 1 (Battery E) | None | None | 100 | 100 |

3. Evaluation of Batteries (1) Table 1 shows that the batteries A, B, C and D do not differ from the battery E in terms of battery capacity. It can be said that the batteries A, B, C and D of the present invention are as high-capacity as a battery, like the battery E, designed to have high capacity by densifying the hydrogen-storage alloy contained in the entire negative electrode. This can be considered as a result of the facts below.

In the negative electrodes included in the batteries A, B, C and D, the diameter of part of hydrogen-storage alloy is increased, and the density of the hydrogen-storage alloy is reduced. To be specific, in the outermost or innermost circumferential portion of the negative electrode, the diameter of the hydrogen-storage alloy is increased, and the density thereof is reduced. The outermost or innermost circumferential portion faces the positive electrode only in one side thereof, contributing relatively less to the charge/discharge reaction of the battery, and does not much effect battery reaction. In the main section of the negative electrode of each of the batteries A, B, C and D, which contributes much to the charge/discharge reaction of the battery, the density of hydrogen-storage alloy is increased as much as in the battery E.

(2) Table 1 also shows that the battery A of Embodiment 1 is improved in cycle life characteristics, as compared to the battery E of Comparative Example 1. This is considered because the battery A partially contained the large-diameter particles of hydrogen-storage alloy in the outermost circumferential portion thereof, and this reduced the specific surface area of hydrogen-storage alloy powder contained in the negative electrode and made the process of the corrosion reaction caused by alkaline electrolyte slower than in the battery E.

(3) It is clear that the battery B of Embodiment 2 is further improved in cycle life characteristics, as compared to the battery E of Comparative Example 1. This is considered because the hydrogen-storage alloy particles contained in the battery B were made large in diameter in the entire outermost circumferential portion, and the amount of the large-diameter hydrogen-storage alloy was relatively increased, which further reduced the specific surface area.

(4) It is also apparent that the battery C of Embodiment 3 is improved in cycle life characteristics as much as Embodiment 2, as compared to the battery E of Comparative Example 1. The hydrogen-storage alloy particles contained in the negative electrode of the battery C is made large in diameter in the innermost circumferential portion that is smaller in region than the outermost circumferential portion. In spite of that, the battery C exerts the cycle life characteristics of the same level as in the battery B. A possible reason for this is that, as a central portion of the electrode group is where the heat generated by battery reaction is easily confined, the effect of making the hydrogen-storage alloy large in diameter is more visible in the innermost circumferential portion of the negative electrode located in the central portion.

(5) It is also apparent that the battery D of Embodiment 4 is further improved in cycle life characteristics, as compared to the batteries A, B and C. This is considered because the diameter of hydrogen-storage alloy was large both in the outermost and innermost circumferential portions of the battery D, and thus, the specific surface area of the hydrogen-storage alloy powder was further reduced.

(6) In Comparative Example 2 where the diameter of hydrogen-storage alloy was increased in the entire negative electrode, it was impossible to assemble the battery. In the negative electrodes of Embodiments 1 to 4, however, the batteries A, B, C and D were able to be assembled. This is because of the reasons below.

In the negative electrodes of the batteries A, B, C and D, the diameter of hydrogen-storage alloy was made large in a portion that has a small effect on the battery reaction. In this portion, the hydrogen-storage alloy does not need to be highly densified, so that the load applied during the rolling process may be low. This makes it possible to minimize damage caused on the negative-electrode core, and the negative electrode thus obtained is enhanced in shape quality. On this account, the batteries were able to be assembled in Embodiment 1 to 4.

(7) According to the invention, it is possible to obtain the negative electrode for a nickel-hydrogen rechargeable battery, which is capable of improving the cycle life characteristics of the battery and enhancing the shape quality of the negative electrode at the same time, if the filling density is set low by using the hydrogen-storage alloy particles whose average diameter is relatively large are used in the outermost and innermost circumferential portions of the negative electrode. Because a nickel-hydrogen rechargeable battery excellent in cycle life characteristics can be produced by using the negative electrode, the invention is very high in industrial value.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A negative electrode for a nickel-hydrogen rechargeable battery, wherein the negative electrode is a strip-shaped negative electrode forming an electrode group with a positive electrode and a separator, which is to be contained in an outer can of a nickel-hydrogen rechargeable battery, wherein the negative electrode is formed of a core body and a negative mixture layer covering both sides of the core body and containing a large number of hydrogen-storage alloy particles, the negative electrode comprising:
   a main section, both sides of which face the positive electrode with the separator intervening therebetween as viewed in a rolled state where the negative electrode forms the electrode group with the positive electrode and the separator, and
   a protruding region that is protruding from an end of the main section in a rolling direction and facing the positive electrode with the separator intervening therebetween only with one side, wherein:
   at least part of the hydrogen-storage alloy particles contained in the protruding region has an average diameter larger than an average diameter of the hydrogen-storage alloy particles contained in the main section,
   wherein a filling density of the hydrogen-storage alloy is lower in the protruding region than a filling density of the hydrogen-storage alloy in the main section.

2. The negative electrode according to claim 1, wherein: the protruding region includes:
   an outermost circumferential portion of the negative electrode, which is to contact a circumferential wall of the outer can as viewed in a rolled state.

3. The negative electrode according to claim 1, wherein: the protruding region includes:
   an innermost circumferential portion of the negative electrode as viewed in the rolled state.

4. The negative electrode according to claim 1, wherein: the protruding region includes:
   the outermost circumferential portion of the negative electrode, which is to contact the circumferential wall of the outer can, and the innermost circumferential portion of the negative electrode as viewed in the rolled state.

5. The negative electrode according to claim 1, wherein: the protruding region includes:
   the outermost circumferential portion of the negative electrode, which is to contact the circumferential wall of the outer can as viewed in the rolled state.

6. The negative electrode according to claim 1, wherein: the protruding region includes:
   the innermost circumferential portion of the negative electrode as viewed in the rolled state.

7. The negative electrode according to claim 1, wherein: the protruding region includes:
   the outermost circumferential portion of the negative electrode, which is to contact the circumferential wall of the outer can, and the innermost circumferential portion of the negative electrode as viewed in the rolled state.

8. A nickel-hydrogen rechargeable battery comprising:
an outer can having a shape like a bottomed cylinder, and
an electrode group contained in the outer can and formed by rolling a negative electrode and a positive electrode into a scroll with a separator intervening therebetween, wherein:
the negative electrode is the negative electrode claimed in claim 1.

9. A nickel-hydrogen rechargeable battery comprising:
an outer can having a shape like a bottomed cylinder, and
an electrode group contained in the outer can and formed by rolling a negative electrode and a positive electrode into a scroll with a separator intervening therebetween, wherein:
the negative electrode is the negative electrode claimed in claim 2.

10. A nickel-hydrogen rechargeable battery comprising:
an outer can having a shape like a bottomed cylinder, and
an electrode group contained in the outer can and formed by rolling a negative electrode and a positive electrode into a scroll with a separator intervening therebetween, wherein:
the negative electrode is the negative electrode claimed in claim 3.

11. A nickel-hydrogen rechargeable battery comprising:
an outer can having a shape like a bottomed cylinder, and
an electrode group contained in the outer can and formed by rolling a negative electrode and a positive electrode into a scroll with a separator intervening therebetween, wherein:
the negative electrode is the negative electrode claimed in claim 4.

12. A nickel-hydrogen rechargeable battery comprising:
an outer can having a shape like a bottomed cylinder, and
an electrode group contained in the outer can and formed by rolling a negative electrode and a positive electrode into a scroll with a separator intervening therebetween, wherein:
the negative electrode is the negative electrode claimed in claim 1.

13. A nickel-hydrogen rechargeable battery comprising:
an outer can having a shape like a bottomed cylinder, and
an electrode group contained in the outer can and formed by rolling a negative electrode and a positive electrode into a scroll with a separator intervening therebetween, wherein:
the negative electrode is the negative electrode claimed in claim 5.

14. A nickel-hydrogen rechargeable battery comprising:
an outer can having a shape like a bottomed cylinder, and
an electrode group contained in the outer can and formed by rolling a negative electrode and a positive electrode into a scroll with a separator intervening therebetween, wherein:
the negative electrode is the negative electrode claimed in claim 6.

15. A nickel-hydrogen rechargeable battery comprising:
an outer can having a shape like a bottomed cylinder, and
an electrode group contained in the outer can and formed by rolling a negative electrode and a positive electrode into a scroll with a separator intervening therebetween, wherein:
the negative electrode is the negative electrode claimed in claim 7.

16. The negative electrode of claim 1, wherein a thickness ratio of the main section to the circumferential is 1:1 to 1:0.85.

* * * * *